United States Patent [19]

Morimoto et al.

[11] Patent Number: 5,466,754
[45] Date of Patent: Nov. 14, 1995

[54] CURABLE RESIN COMPOSITION

[75] Inventors: Takao Morimoto, Suita; Shinji Nakano, Takatsuki, both of Japan

[73] Assignees: Nippon Paint Co., Ltd.; Daicel Chemical Industries, Ltd., both of Osaka, Japan

[21] Appl. No.: 379,956

[22] Filed: Jan. 27, 1995

[30] Foreign Application Priority Data

Jan. 28, 1994 [JP] Japan .................... 6-026038

[51] Int. Cl.$^6$ .................... C08L 37/00; C08L 33/14; C08F 124/00; C08F 120/28
[52] U.S. Cl. .................... 525/206; 525/113; 525/117; 525/175; 525/176; 525/186; 525/223; 525/328.8; 525/383; 525/385; 525/439; 525/523; 526/269
[58] Field of Search .................... 525/113, 117, 525/175, 176, 186, 206, 223, 328.8, 383, 385, 439, 523; 526/269

[56] References Cited

U.S. PATENT DOCUMENTS 3,507,884 4/1970 Hostettler .................... 526/269
5,374,699 12/1994 Iwamura .................... 526/269

FOREIGN PATENT DOCUMENTS 263659 10/1989 Japan .

*Primary Examiner*—David Buttner
*Attorney, Agent, or Firm*—Millen, White, Zelano & Branigan

[57] ABSTRACT

A curable resin composition utilizing as the crosslinking mechanism thereof an acid catalyzed addition reaction of a cyclic alkylenecarbonate group with an alcoholic hydroxyl group is disclosed. The composition contains a compound or polymer having a plurality of 6-membered cyclic alkylenecarbonate groups and a polymer having a plurality of alcoholic hydroxyl groups. A polymer having pluralities of the cyclic alkylenecarbonate and hydroxyl groups in a single entity may also be used. The composition cures at room or elevated temperatures depending upon the acidity and amount of particular acid catalyst incorporated to the composition.

10 Claims, No Drawings

CURABLE RESIN COMPOSITION

FIELD OF THE INVENTION

This invention relates to a novel curable resin composition utilizing an addition reaction between a cyclic carbonate group and a hydroxyl group as the crosslinking mechanism thereof.

BACKGROUND OF THE INVENTION

It is known that an cyclic carbonate may react with a compound having an alcoholic hydroxyl group to produce a linear carbonate adduct of these reactants. To our best knowledge, however, a curable resin system utilizing this reaction as the crosslinking mechanism thereof has not been known yet. Since the above reaction is an addition reaction producing no reaction by-product and since a chemically stable carbonate linkage is newly formed, the above curable resin system may find use in coating and other applications where excellent acid- or other chemical resistances are desired in the cured product thereof while minimizing volumetric shrinkage upon curing.

Recently, Endo et al. reported a system in which polymers having a plurality of pendant cyclic carbonate groups produced by copolymerizing a cyclic carbonate having a vinyl group with a conventional vinyl monomer are crosslinked with sodium methoxide or a diamine. Polymer Preprints, Japan, vol. 41, No. 2, 318 (1992); and ibid., vol. 42, No. 2, 244 (1993). This system, however, does not utilize the addition reaction between a cyclic carbonate group and an alcoholic hydroxyl group as the crosslinking mechanism thereof.

JP-A-04285623, JP-A-04325538 and JP-A-04325539 disclose curable resin compositions containing polymers having a plurality of 5-membered cyclic carbonate groups, namely 1,3-dioxolane-2-one-4-yl groups. These systems are distinguished from the present invention in that not only the cyclic carbonate group is a 5-membered ring but also the crosslinking mechanism does not solely relies on the addition reaction of a cyclic carbonate group with an alcoholic hydroxyl group.

SUMMARY OF THE INVENTION

The instant invention provides a novel curable resin composition which utilizes as the crosslinking mechanism thereof an addition reaction between a cyclic alkylenecarbonate group and an alcoholic hydroxyl group. According to the invention, said curable resin composition comprises a mixture of a compound or polymer having a plurality of 6-membered cyclic alkylenecarbonate groups and a polymer having a plurality of alcoholic hydroxyl groups, or a polymer having pluralities of said cyclic alkylenecarbonate groups and said alcoholic hydroxyl groups in a single entity; and (b) an amount of an acid catalyst effective to promote the addition reaction between said cyclic alkylenecarbonate group and said alcoholic hydroxyl group.

The composition of the present invention may be cured into a rigid state even at room temperature or at an elevated temperature up to 180° C. essentially without evolving a reaction by-product. In addition, the linkage newly formed in the cured resin for crosslinking is a linear carbonate linkage which is refractory to chemical degradation such as hydrolysis. These advantages make the inventive composition useful for coating, potting, casting and other applications where an excellent chemical resistance is desired in the cured resin while minimizing volumetric shrinkage upon curing.

DETAILED DESCRIPTION OF PREFFERED EMBODIMENT

Compound having a plurality of 6-membered cyclic carbonate groups

JP-A-54144282 discloses a variety of 6-membered cyclic carbonates useful as a copolymerizing component of polycarbonate resins. The entire disclosure thereof is incorporated herein by reference. In order to utilize in the crosslinking reaction among hydroxyl groups possessed by a polymeric component, the compound should have at least two cyclic carbonate groups in the molecule. Typical examples of such compounds include di-(trimethylolpropane)dicarbonate and di-(trimethylolpropanecarbonate-)carbonate, spiro-bis(dimethylenecarbonate), otherewise called 2,4,7,9 -tetraoxo-spiro[5,5]undecane-3,8-dione.

Polymers having a plurality of 6-membered cyclic carbonate groups

Endo et al., cited supra, discloses certain monomers having a 6-membered cyclic alkylenecarbonate group including 5-ethyl-(meth)acryloyloxymethyl-1,3-dioxanane-2-one, 4-(5 -ethyl-2-oxo-1,3-dioxan-5-ylmethoxymethyl-)styrene and 5 -methylene-2-oxo-1,3-dioxane. Other examples of monomers having a 6-membered cyclic carbonate group and a polymerizable vinyl group include 5-[N-(2-methacryloyloxy) ethylcarbamoyloxy-methyl]-5-ethyl-1,3-dioxane-2-one and 5 -N-methacryloylcarbomoyloxymethyl-5-ethyl-1,3-dioxane-2-one produced by reacting 2-isocyanatoethyl methacrylate and methacryloyl isocyanate, respsectively with trimethylopropane monocarbonate to form a urethane linkage between the isocyanate monomer and the hydroxyl group remained in trimethylpropane monocarbonate.

Any monomer having a 6-membered cyclic alkylenecarbonate group may be copolymerized with a conventional monomer to produce a copolymer having a plurality of said cyclic carbonate groups. Examples of conventional monomers include (meth)acrylate esters such as methyl, ethyl, n-propyl, isopropyl, n-butyl, sec-butyl, t-butyl and 2-ethylhexyl esters, acrylonitrile, styrene, α-methylstyrene, vinyl acetate and the like. The resulting copolymer preferably has a number average molelular weight from 800 to 50,000 and more preferably from 1,000 to 20,000, and contains at least 5% and more preferably from 10 to 50% by weight of the copolymer of a monomer having said cyclic carbonate group.

Polymers having a plurality of hydroxyl groups

A first class of polymers having a plurality of hydroxyl groups is a polymer known as acryl polyol. Acryl polyols are produced by copolymering a hydroxyl group-containing acrylic monomer and a monomer free of the hydroxyl group. Examples of hydroxyl group-containing acrylic monomers include hydroxyalkyl (meth)acrylates such as 2-hydroxyethyl, 2-hydroxypropyl or 4-hydroxylbutyl (meth) acrylate, adducts of 2-hydroxyethyl (meth)acrylate with ε-caprolactone known as PLACCEL FA and FM series sold by Daicel Chemical Industries, Ltd., and adducts of 2-hydroxyethyl (meth)acrylate with neopentyl glycol carbonate also sold by Daicel Chemical Industries, Ltd. Examples of monomers copolymerizable therewith include (meth)acrylate esters such as methyl, ethyl, n-propyl, isopropyl, n-butyl, sec-butyl, t-butyl and 2-ethylhexyl esters, acrylonitrile, styrene, α-methylstyrene, vinyl acetate and the like. The resulting copolymer preferably has a number average molecular weight from 800 to 50,000 and more preferably from 1,000 to 20,000, and contains at least 5% and more preferably 10 to 50% by weight of the copolymer of said hydroxyl group-containing acrylic monomer.

Another class of polymers having a plurality of hydroxyl groups is a bisphenol epoxy resin having a plurality of hydroxyl groups in the polymer backbone. Bisphenol epoxy resins are produced by reacting a bisphenol such as bisphenol A, bisphenol F or bisphenol S with epichlorohydrine in the presence of an alkali. If more than 3 moles of a bisphenol are condensed with epichlorohydrine, the reaction product will have a plurality of secondary alcoholic hydroxyl groups attached to 1,3-propylene bridge which connects adjacent bisphenol molecules. Such epoxy resins are commercially available from many sources such as EPIKOTE 1004 from Yuka Shell Epoxy K.K.

A further class of polymers having a plurality of hydroxyl groups is a polyester known as polyetser polyol. As is well-known, polyesters are produced by the polycondensation reaction of a polycarboxylic acid component and a polyhydric alcohol component. If the polyhydric alcohol component is used in excess in this reaction, the reaction proudct will have a plurality of hydroxyl groups at terminals. Also included in this class are hydroxy-terminated polycaprolactone polyols such as PLACCEL 303 sold by Daicel Chemical Industries, Ltd., produced by addition polymerizing ε-caprolactone using a polyhydric alcohol as initiator. Usable polyester polyols preferably have a hydroxyl number from 30 to 500, and a molecular weight from 500 to 10,000.

Polymers having pluralities of both cyclic carbonate groups and hydroxyl groups Polymers of this class may be produced by copolymerizing a monomer having a 6-membered cyclic alkylenecarbonate group, a hydroxyl group-containing monomer and a conventional monomer, as discussed in the preceding sections. The copolymer preferably has a number average molecular weight from 800 to 50,000 and more preferably from 1,000 to 20,000, and contains at least 5% and more preferably from 10 to 50% by weight of the copolymer of the cyclic carbonate monomer and the hydroxy group-containing monomer, respectively.

Acid catalyst

The crosslinking reaction of the composition of the present invention will not occur under practical conditions in the absence of an acid catalyst. Usable acid catalysts include Bronsted acids such as hydrochloric, nitric, p-toluenesulfonic or trifluoromethanesulfonic acid, and Lewis acids such as dibutyltin dilaurate, dibutyltin oxide or zinc chloride.

Curable resin composition

The curable resin composition of the present invention encompasses as curable component (1) a combination of a compound having a plurality of 6-membered cyclic carbonate groups and a polymer having a plurality of hydroxyl groups, (2) a polymer having a plurality of 6-membered cyclic carbonate groups and a polymer having a plurality of hydroxyl groups, and (3) a polymer having pluralities of 6-membered cyclic carbonate groups and hydroxyl groups in a single entity. In each case, the molar ratio of the carbonate function to the hydroxyl function may vary in a range between 1:0.5 and 1:6 and preferably between 1:0.8 and 1:5, although the ratio is 1:1 in theory.

The amount of acid catalyst may be less than 5% and preferably less than 3% by weight of the solids of the entire composition. The composition may be cured at room temperature or at an elevated temperature up to 180° C. depending upon the acidity and concentration of particular acid catalyst added.

The following examples are given for illustrative purposes only. All parts and percents therein are by weight unless otherwise specified.

Production Example 1

A mixture of 240 g of styrene, 278.4 g of 2-hydroxyethyl methacrylate, 61.2 g of isobutyl methacrylate, 336 g of isobutyl acrylate, 1284.4 g of n-butyl methacrylate and 36 g of t-butyl peroctanoate was added dropwise to 316.4 g of xylene preheated to 90° C. over 3 hours, followed by stirring at the same temperature for 30 minutes. Then a solution of 3.6 g of t-butyl peroctanoate in 24.0 g of xylene was added dropwise over 30 minutes, followed by stirring at 90° C. for 1 hour. A solution of a polymer called "Acrylic Polymer A" having Mn=12,000, Mw/Mn=1.81, and an hydroxyl number of 99 mg KOH/g was obtained.

Production Example 2

A mixture of 470 g of styrene, 200 g of 5-ethyl-5-methacryloyloxymethyl-1,3-dioxane-2-one and 20.1 g of t-butyl peroctanoate in 50.0 g of xylene was added to 100.0 g of xylene preheated to 90° C. over 3 hours, followed by stirring for 1 hour at the same temperature. A solution of a polymer called "Acrylic Polymer B" having Mn=14,000, Mw/Mn=1.7, and a cylic carbonate group content of 1.31 mmol/g was obtained.

Production Example 3

A mixture of 470 g of styrene, 20.0 g of 5-ethyl-5-methacryloyloxymethyl-1,3-dioxane-2-one, 114 g of 2-hydroxyethyl methacrylate and 23.5 g of t-butyl peroctanoate in 750.0 g of xylene was added dropwise to 100.0 g of xylene preheated to 100° C. over 1 hour, followed by stirring at the same temperature for 2 hours. A solution of a polymer called "Acrylic Polymer C" having Mn=7,800, Mw/Mn=1.98, a cyclic carbonate group content of 1.31 mmol/g and a hydroxyl number of 62.6 mg KOH/g was obtained.

Production Example 4

A mixture of 300 g of 2-hydroxyethyl acrylate, 700 g of styrene and 5.0 g of t-butyl peroctanoate was added dropwise to 1,000 g of xylene preheated to 120° C. over 4 hours, followed by stirring at the same temperature for 2 hours. A solution of a polymer called "Acrylic Polymer D" having Mn=4,500, Mw/Mn=1.59 and a hydroxyl number of 131 mg KOH/g was obtained.

Production Example 5

A mixture of 240 g of styrene, 278.4 g of 2-hydroxyethyl methacrylate, 61.2 g of isobutyl methacrylate, 336 g of isobutyl acrylate, 284.4 g of n-butyl methacrylate and 96 g of t-butyl peroctanoate was added dropwise to 316.4 g of xylene preheated to 120° C. over 3 hours, followed by stirring at the same temperature for 30 minutes. Then a solution of 9.5 g of t-butyl peroctanoate in 24.0 g of xylene was added dropwise over 30 minutes, followed by stirring at 120° C. for 1 hour. A solution of a polymer called "Acrylic Polymer E" having Mn=3,000, Mw/Mn=1.67 and a hydroxyl number of 99 mg KOH/g was obtained.

Production Example 6

A mixture of 470 g of styrene, 200 g of 5-ethyl-5-methacryloyloxymethyl-1,3-dioxane-2-one, and 60.3 g of t-butyl peroctanoate in 500 g of xylene was added dropwise to 100 g of xylene preheated to 120° C. over 3 hours, followed by stirring at the same temperature for 1 hour. A solution of a polymer called "Acrylic Polymer F" having Mn=2,500, Mw/Mn=1.85 and a cyclic carbonate group content of 1,31 mmol/g was obtained.

Example 1

A composition consisting of 50 parts as solids of Acrylic Polymer A, 50 parts as solids of Acrylic Polymer B and 1 part of p-toluenesulfonic acid (ratio of Polymer A/Polymer B in terms of functional group equivalents=1.34/1) was applied onto a tinplate, and baked at different temperatures between 80° C. and 180° C. for 20 minutes. The curability of the composition was evaluated by subjecting its cured films to the xylene rubbing test. The result is shown in Table 1.

Example 2

A composition consisting of 70 parts as solids of Acrylic Polymer D, 30 parts as solids of Acrylic Polymer B and 1 part of p-toluenesulfonic acid (ratio of Polymer D/Polymer B in terms of functional group equivalents= 4.15/1) was applied onto a tinplate, and baked at different temperatures between 80° C. and 180° C. for 20 minutes. The curability of the composition was evaluated by subjecting its cured films to the xylene rubbing test. The result is shown in Table 1.

Example 3

A composition consisting of 50 parts as solids of Acrylic Polymer D, 50 parts as solids of Acrylic Polymer B and 5 parts of p-toluenesulfonic acid (the ratio of Polymer D/Polymer B in terms of functional group equivalents=1.78/1) was applied onto a tinplate, and allowed to cure at room temperature for different lengths of time. The curability of the composition was evaluated by subjecting its cured films to the xylene rubbing test. The result is shown in Table 2.

Example 4

100 parts as solids of Acrylic Polymer C and 2 parts of p-toluenesulfonic acid were mixed. This composition was applied on a tinplate and baked at different temperatures between 80° C. and 180° C. for 20 minutes. The curability of the composition was evaluated by subjection its cured films to the xylene rubbing test. The result is shown in Table 1.

Example 5

A composition consisting of 50 parts as solids of Acrylic Polymer D, 50 parts as solids of Acrylic Polymer B and 1 part of trifluoromethanesulfonic acid (ratio of Polymer D/Polymer B in terms of functional group equivalents=1.78/1) was applied onto a tinplate, and allowed to cure at room temperature for different lengths of time. The curability of the composition was evaluated by subjecting its cured films to the xylene rubbing test. The result is shown in Table 2.

Example 6

A composition consisting of 50 parts as solids of Acrylic Polymer D, 50 parts as solids of Acrylic Polymer B and 5 parts of trifluoromethanesulfonic acid (ratio of Polymer D/Polymer B in terms of functional group equivalents=1.78/1) was applied onto a tinplate, and allowed to cure at room temperature for different lengths of time. The curability of the composition was evaluated by subjecting its cured films to the xylene rubbing test. The result is shown in Table 2.

Example 7

100 parts as solids of Acrylic Polymer C and 2 parts of trifluoromethanesulfonic acid were mixed. This composition was applied on a tinplate and allowed to cure at room temperature for different lengths of time. The curability of the composition was evaluated by subjecting its cured films to the xylene rubbing test. The result is shown in Table 2.

Example 8

100 parts as solids of Acrylic Polymer C and 5 parts of trifluoromethanesulfonic acid were mixed. This composition was applied on a tinplate and allowed to cure at room temperature for different lengths of time. The curability of the composition was evaluated by subjecting its cured films to the xylene rubbing test. The result is shown in Table 2.

Example 9

A composition consisting of 50 parts as solids of Acrylic Polymer E, 50 parts as solids of Acrylic Polymer B and 1 part of p-toluenesulfonic acid (ratio of Polymer E/Polymer B in terms of functional group equivalents=1.34/1) was applied on a tinplate, and baked at different temperatures for 20 minutes. The curability of the composition was evaluated by subjecting its cured films to the xylene rubbing test. The result is shown in Table 1.

Example 10

A composition consisting of 70 parts as solids of Acrylic Polymer E, 30 parts as solids of Acrylic Polymer B and 1 part of p-toluenesulfonic acid (ratio of Polymer E/Polymer B in terms of functional group equivalents=3.13/1) was applied on a tinplate, and baked at different temperatures for 20 minutes. The curability of the composition was evaluated by subjecting its cured films to the xylene rubbing test. The result is shown in Table 1.

Example 11

A composition consisting of 50 parts as solids of Acrylic Polymer E, 50 parts as solids of Acrylic Polymer F and 5 parts of p-toluenesulfonic acid (ratio of Polymer E/Polymer F in terms of functional group equivalents= 1.34/1) was applied on a tinplate, and allowed to cure at room temperature for different lengths of time. The curability of the composition was evaluated by subjecting its cured films to the xylene rubbing test. The result is shown in Table 2.

Example 12

A composition consisting of 50 parts as solids of Acrylic Polymer E, 50 parts as solids of Acrylic Polymer F and 1 part of p-toluenesulfonic acid (ratio of Polymer E/Polymer F in terms of functional group equivalents=1.34/1) was applied on a tinplate, and baked at different temperatures for 20 minutes. The curability of the composition was evaluated by subjecting its cured films to the xylene rubbing test. The result is shown in Table 1.

Example 13

A composition consisting of 50 parts as solids of Acrylic Polymer B, 5 parts as solids of PLACCEL 303 and 1 part of p-toluenesulfonic acid (ratio of Polymer B/PLACCEL 303 in terms of functional group equivalents=1.3/1) was applied on a tinplate, and baked at different temperatures for 20 minutes. The curability of the composition was evaluated by subjecting its cured films to the xylene rubbing test. The result is shown in Table 1.

Example 14

A composition consisting of 50 parts as solids of Acrylic Polymer B, 5 parts as solids of PLACCEL 303 and 5 parts of p-toluenesulfonic acid (ratio of Polymer B/PLACCEL 303 in terms of functional group equivalents=1.3/1) was applied on a tinplate, and baked at different temperatures for 20 minutes. The curability of the composition was evaluated by subjecting its cured films to the xylene rubbing test. The result is shown in Table 1.

Example 15

A composition consisting of 50 parts as solids of Acrylic Polymer B, and 5 parts as solids of PLACCEL 303 and 5 parts of p-toluenesulfonic acid (ratio of Polymer B/PLACCEL 303 in terms of functional group equivalents=1.3/1) was applied on a tinplate, and allowed to cure at room temperature for different lengths of time. The curability of the composition was evaluated by subjecting its cured films to the xylene rubbing test. The result is shown in Table 2.

Example 16

A composition consisting of 22 parts as solids of Acrylic Polymer F, 10 parts as solids of EPIKOTE 1004 and 1 part of p-toluenesulfonic acid (ratio of Polymer F/EPIKOTE 1004 in terms of functional group equivalents=1/1) was applied on a tinplate, and baked at different temperatures for 20 minutes. The curability of the composition was evaluated by subjecting its cured films to the xylene rubbing test. The result is shown in Table 1.

Example 17

A composition consisting of 22 parts as solids of Acrylic Polymer F, 10 parts as solids of EPIKOTE 1004 and 5 parts of p-toluenesulfonic acid (ratio of Polymer F/EPIKOTE 1004 in terms of functional group equivalents=1/1) was applied on a tinplate, and baked at different temperatures for 20 minutes. The curability of the composition was evaluated by subjecting its cured films to the xylene rubbing test. The result is shown in Table 1.

Example 18

A composition consisting of 50 parts as solids of Acrylic Polymer B, and 10 parts as solids of EPIKOTE 1004 and 5 parts of p-toluenesulfonic acid (ration of Polymer B/EPIKOTE 1004 in terms of functional group equivalents= 1/1) was applied on a tinplate, and allowed to cure at room temperature for different lengths of time. The curability of the composition was evaluated by subjecting its cured films to the xylene rubbing test. The result is shown in Table 2.

TABLE 1

Curability at elevated temperatures evaluated by film appearance after the xylene rubbing test at 100 reciprocations.

| Composition | Temperature, °C. | | | | | |
|---|---|---|---|---|---|---|
| | 80 | 100 | 120 | 140 | 160 | 180 |
| Ex. 1 | A | B | B | C | C | C |
| Ex. 2 | A | A | B | B | B | C |
| Ex. 4 | A | B | B | B | B | C |
| Ex. 9 | A | B | B | C | C | C |
| Ex. 10 | A | A | A | B | B | C |
| Ex. 12 | A | A | A | A | B | C |
| Ex. 14 | A | B | B | C | C | C |
| Ex. 15 | A | B | B | C | C | C |
| Ex. 16 | A | A | A | B | B | C |
| Ex. 17 | A | A | B | B | C | C |

Remarks:
A: The film was dissolved.
B: The film was whitened.
C: Not changed.

TABLE 2

Curability at room temperature evaluated by film appearance after the xylene rubbing test at 100 reciprocations.

| Composition | Time, hour | | | | | | |
|---|---|---|---|---|---|---|---|
| | 1 | 2 | 6 | 8 | 15 | 24 | 36 |
| Ex. 3 | — | A | A | B | C | C | C |
| Ex. 5 | A | A | A | B | C | C | — |
| Ex. 6 | A | A | B | C | C | C | — |
| Ex. 7 | A | A | B | B | C | C | — |
| Ex. 8 | A | B | B | C | C | C | — |
| Ex. 11 | A | A | A | A | B | C | C |
| Ex. 15 | A | A | B | B | C | C | — |
| Ex. 18 | A | A | A | B | B | C | — |

Remarks:
A: The film was dissolved.
B: The film was whitened.
C: Not changed.

We claim:
1. A curable resin composition comprising
  (a) (i) a mixture of a compound or polymer having a plurality of 6-membered cyclic alkylenecarbonate groups and a polymer having a plurality of alcoholic hydroxyl groups, or (ii) a polymer having pluralities of said cyclic alkylenecarbonate groups and said hydroxyl groups in a single entity; and
  (b) an amount of an acid catalyst effective to promote the addition reaction between said cyclic alkylenecarbonate group and said alcoholic hydroxyl group.
2. The curable resin composition according to claim 1, wherein said compound having a plurality of 6-membered cyclic alkylenecarbonate groups is di-(trimethylolpropane)dicarbonate, di-(trimethylolpropanecarbonate)carbonate or spiro-bis(dimethylenecarbonate).
3. The curable resin composition according to claim 1, wherein said polymer having a pluratliy of 6-membered cyclic alkylenecarbonate groups is an acrylic copolymer containing as a monomeric constituent 5-ethyl-5-(meth)acryloyloxymethyl-1,3-dioxane-2-one, 4-(5 -ethyl-2-oxo-1,3-dioxane-5-ylmethoxymethyl)styrene, 5-methylene-2-oxo-1,3-dioxane, an adduct of trimethylolpropanemonocarbonate and 2-isocyanatoethyl methacrylate, or an adduct of trimethylolpropanemonocarbonate and methacryloyl isocyanate.

4. The curable resin composition according to claim 1, wherein said polymer having a plurality of alcoholic hydroxyl groups is an acrylic copolymer containing as a monomeric constituent an hydroxyalkyl (meth)acrylate, an adduct thereof with ε-caprolactone or an adduct thereof with neopentyl glycol carbonate.

5. The curable resin composition according to claim 1, wherein said polymer having a plurality of alcoholic hydroxyl groups is a bisphenol epoxy resin having a plurality of 2-hydroxy-1,3-propylene bridges between adjacent bisphenol moieties.

6. The curable resin composition according to claim 1, wherein said polymer having a plurality of alcoholic hyxroxyl groups is a polyester having a plurality of hydroxyl groups.

7. The curable resin composition according to claim 1, wherein said polymer having pluralities of said cyclic alkylenecarbonate groups and said hydroxyl groups is an acrylic copolymer containing as a monomeric constituent (a) 5-ethyl-5-(meth)acryloyloxymethyl-1,3-dioxane-2-one, 4-(5-ethyl-2-oxo-1,3-dioxan-5-ylmethoxymethyl)styrene, 5-methylene-2-oxo-1,3-dioxane, an adduct of trimethylolpropanemonocarbonate and 2-isocyanatoethyl methacrylate, or an adduct of trimethylolpropanemonocarbonate and methacryloyl isocyanate and (b) a hydroxyalkyl (meth)acrylate, an adduct thereof with ε-caprolactone or an adduct thereof with neopentyl glycol carbonate.

8. The curable resin composition according to claim 1, wherein the equivalent ratio of said cyclic alkylenecarbonate group to said hydroxyl group in said composition is from 0.5 to 5.0.

9. The curable resin composition according to claim 1, wherein said acid catalyst is a Bronsted acid.

10. The curable resin composition according to claim 1, wherein said acid catalyst is a Lewis acid.

* * * * *